United States Patent
Brookes et al.

(10) Patent No.: US 12,460,996 B2
(45) Date of Patent: Nov. 4, 2025

(54) METHOD FOR TESTING THE OPERATION OF A NEXT GENERATION RESCUE HOIST

(71) Applicant: Goodrich Actuation Systems Limited, Solihull (GB)

(72) Inventors: David Brookes, Birmingham (GB); Bejan Ijadi-Maghsoodi, San Dimas, CA (US)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 335 days.

(21) Appl. No.: 18/330,637

(22) Filed: Jun. 7, 2023

(65) Prior Publication Data

US 2023/0393025 A1    Dec. 7, 2023

(30) Foreign Application Priority Data

Jun. 7, 2022   (EP) .................................... 22275076

(51) Int. Cl.
*G01M 99/00*       (2011.01)
*B66D 3/18*        (2006.01)

(52) U.S. Cl.
CPC ............... *G01M 99/00* (2013.01); *B66D 3/18* (2013.01)

(58) Field of Classification Search
CPC .................................. G01M 99/00; B66D 3/18
See application file for complete search history.

(56) References Cited

U.S. PATENT DOCUMENTS

| | | | |
|---|---|---|---|
| 7,970,520 B2 | 6/2011 | Gross | |
| 10,571,365 B2 | 2/2020 | Bryson et al. | |
| 10,752,478 B2 | 8/2020 | Ijadi-Maghsoodi et al. | |
| 2017/0138880 A1* | 5/2017 | Veronesi | G01N 27/20 |
| 2019/0308853 A1* | 10/2019 | Bryson | B66D 1/54 |
| 2021/0039928 A1* | 2/2021 | Maghsoodi | B66D 5/30 |

FOREIGN PATENT DOCUMENTS

| | | |
|---|---|---|
| EP | 1661845 A1 | 5/2006 |
| EP | 2492661 A1 | 8/2012 |
| EP | 3772482 A1 | 2/2021 |

OTHER PUBLICATIONS

Abstract for EP2492661 (A1), Published: Aug. 29, 2012, 1 page.
European Search Report for Application No. 22275076.2, mailed Nov. 30, 2022, 6 pages.

* cited by examiner

*Primary Examiner* — Kristina M Deherrera
*Assistant Examiner* — Jean F Morello
(74) *Attorney, Agent, or Firm* — CANTOR COLBURN LLP

(57) ABSTRACT

A method for testing a rescue hoist that includes motor drive train. The motor drive train includes: a primary load brake, a secondary load brake and a cable drum comprising a cable. The method includes: reeling the cable out of the cable drum followed by reeling the cable in at a speed that is sufficient to disengage the primary load brake and verifying that the cable drum is rotating. When verified that the cable drum is rotating, the method further comprises the step of decreasing the motor torque output, before engaging the secondary brake. The method further comprises the step of verifying that said cable drum has stopped rotating, and if it is verified that the cable drum has stopped rotating, disengaging the secondary brake, restoring torque motor output and then reeling said cable is reeled into the homed position and the test is confirmed to have been passed.

12 Claims, 5 Drawing Sheets

METHOD FOR TESTING THE OPERATION OF A NEXT GENERATION RESCUE HOIST

CROSS REFERENCE TO RELATED APPLICATION

This application claims priority to European Patent Application No. 22275076.2 filed Jun. 7, 2022, the entire contents of which is incorporated herein by reference.

TECHNICAL FIELD

The methods described herein relate to methods for testing the operation of a hoist.

BACKGROUND

The design of the helicopter rescue hoist has remained largely unchanged for a number of years, however, recently the certification authorities have been consulting with SAE international on a new Minimum Operation Performance Standard (MOPS) which is published as AS6342 by SAE International.

It is standard practice for a rescue hoist to contain an arresting or hold system (also known as the primary brake). This brake is capable of holding the load in the event of (for example) a power failure to the main drive motor.

It is also standard practice for the system to contain an overload protection device (overload clutch).

Within AS6342 there exists a requirement for 'Inadvertent loss of load' to achieve a failure rate of 1×10−9 per flight hour (catastrophic). This requirement effectively requires there to be no single point fault within the hoist load path.

There is a need to provide a new and improved method for testing a rescue hoist.

SUMMARY

A computer implemented method for testing a rescue hoist is described herein, wherein said hoist comprises a motor drive train, said motor drive train comprising: a primary load brake, a secondary load brake and a cable drum comprising a cable. The method comprises the steps of, starting with said cable of said hoist being at least partially out of said cable drum, reeling the cable into said cable drum at a speed that is sufficient to disengage the primary load brake and verifying that the cable drum is rotating. If it is verified that the cable drum is rotating, decreasing the motor torque output, engaging the secondary brake and verifying that said cable drum has stopped rotating. If it is verified that the cable drum has stopped rotating, disengaging the secondary brake, restoring torque motor output and reeling said cable in to the homed position. The test may then be confirmed as being passed.

In some examples, said step of decreasing the motor torque output may comprise reducing the phase current from the nominal current limit.

In some examples, said step of decreasing the motor torque output may comprise increasing the phase advance of the motor.

In some examples, said step of decreasing the motor torque may comprise increasing the phase advance by more than 45 degrees.

In some examples, following said step of verifying that said cable drum has stopped rotating, the method may further comprise increasing the duty cycle and checking that the current limit has been achieved In some examples, if said current limit has not been achieved, the method may comprise the step of checking if duty cycle has been set to a maximum value.

In some examples, if said current limit has been achieved, the method may comprise said step of then releasing the secondary brake.

In some examples, if said duty cycle has not been set to the maximum value, the method may return back to the step of increasing the duty cycle.

In some examples, if said duty cycle has been set to the maximum value, the method may further comprise the step of identifying that the test has failed.

In some examples, if in said step of verifying that said cable drum is rotating, it may be verified that the said drum is not rotating, indicating that the test has failed.

In some examples, the method may further comprise, following the step of decreasing the motor torque output and before the step of engaging the secondary brake, monitoring the cable drum rotation.

A controller is also described herein that is configured to perform these methods.

DETAILED DESCRIPTION

It is standard practice for a rescue hoist to contain an arresting or hold system, known as the primary brake, which is capable of holding the load in the event of failure of the main drive motor. The system also contains an overload protection device known as an overload clutch. There is now a requirement that there be no single point fault within the hoist load path and in order to achieve this rescue hoists may be provided with a second means of stopping the hoist in the event of failure of the primary load path. This second means of stopping may comprise a secondary brake. The secondary brake is as close as possible to the load in the drive train, i.e. after the overload clutch.

Figure 1:
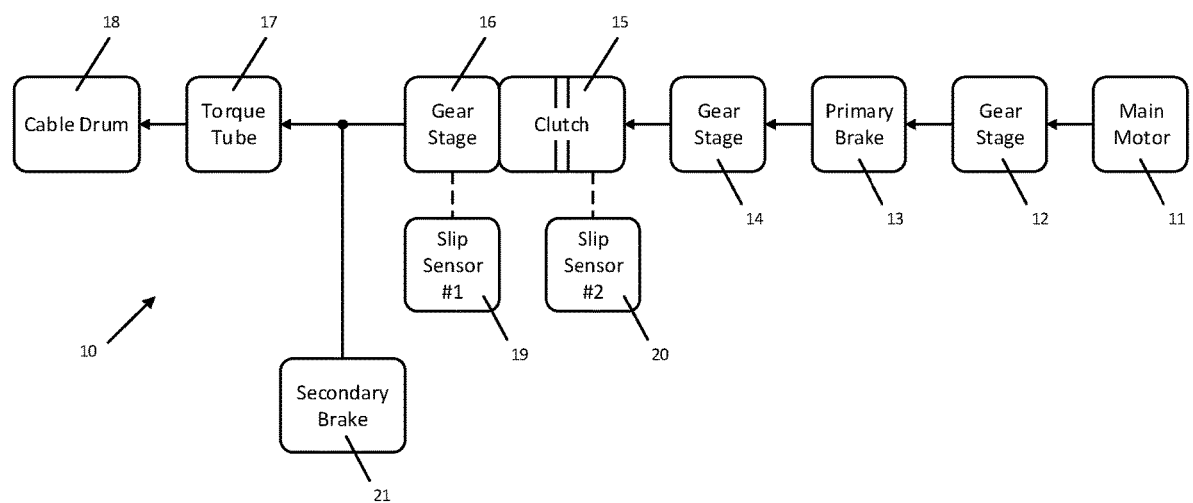
FIG. 1 depicts a motor drive train for driving the movement of a rescue hoist.

The basic drive train architecture is shown in FIG. 1. The drive train comprises a main motor 11 which is connected to a primary brake 13 via a first gear stage 12. Downstream of the primary brake 13, a clutch 15 is provided, which is connected to the primary brake 13 via a second gear stage 14. A third gear stage 16 connects the clutch 15 to a torque tube 17, which in turns is connected to a cable drum 18. The third gear stage 16 and the clutch 15 may each be connected to a first and second slip sensor, 19, 20, respectively. The secondary brake 21 is connected downstream of the clutch 15, and positioned in between the cable drum 18 and the clutch 15.

As the secondary brake has been included in the system to mitigate a hazard, some form of pre-flight (or periodic) test is needed to detect dormant faults within this element of the system. The examples described herein therefore provide a method for detecting such dormant faults. The method can be a computer implemented method. A controller may therefore be provided that is configured to perform this method.

Rotating machines have multiple sources of tolerance leading to variability in the potential torque output. As the main motor 10 is designed to meet the operational requirements under worst case conditions, a typical machine is significantly more capable than that which is required under such worst case conditions. In addition, there is finite tolerance of the motor drive current, which also causes a variation in torque capability.

It is possible for the combination of these factors to allow the main motor to have sufficient torque to slip the hoist clutch 15 when the secondary brake 21 is engaged. The resultant slip, however, causes fatigue on the secondary brake 21. Over time the fatigue on the secondary brake 21 could lead to a failure, should this test be performed prior to each flight.

There is therefore a need to provide a new and improved method for testing a rescue hoist that does not cause adverse wear on the drive train components of the hoist, and in particular that does not cause adverse wear or fatigue on the secondary brake 21. Since the secondary brake 21 is a new part of this next generation hoist system, there is currently no built-in test on such legacy hoists.

The new methods described herein provide a built-in test (pre-flight test routine) that is configured to take advantage of existing features of the motor drive and hoist control system. These methods are able to successfully test the secondary brake 21 without excessive wear on the clutch 15 or other brake components.

Figure 2:
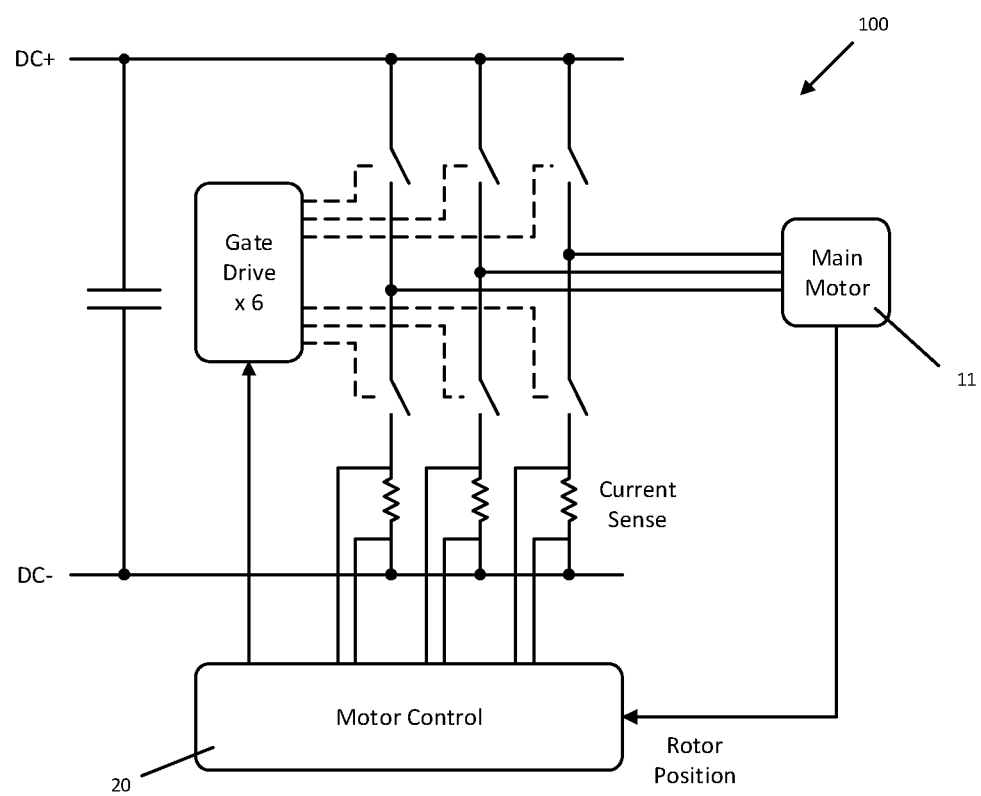
FIG. 2 depicts a typical brushless DC motor drive.

A brushless DC motor drive 100 is shown in FIG. 2.

It is typical for such a motor drive control loop to contain two components. The main motor 11 provides feedback to the motor control 20. The inner torque loop is closed via current sense and in addition, the outer speed loop is closed using the rotor position feedback. The rotor position is also used to determine the commutation timing for the six switches.

In the hoist application the input power to the drive also needs to be limited so as to not overload the aircraft bus. The new methods described herein use the current sense term of the control to modify the duty cycle of the switches to maintain the motor peak current but limit the input DC current. In this way, when operating with an input power limit the torque is maintained but the speed of the motor reduces.

A number of options exist within the motor control to achieve this reduction in the output torque of the motor:
1. Reduce the phase current from the nominal current limit.
2. Phase advance the drive current with respect to the back electromagnetic field (EMF).
3. In the case of a field-oriented control sine wave drive employ field weakening to increase the reactive component of the current.

For the first option, wherein the phase current is reduced, the reduction in torque is proportional to the reduction in current as governed by the machine torque constant Kt. The % current reduction therefore is determined by the level of margin required on the clutch torque setting compared to a nominal motor.

Figure 3:
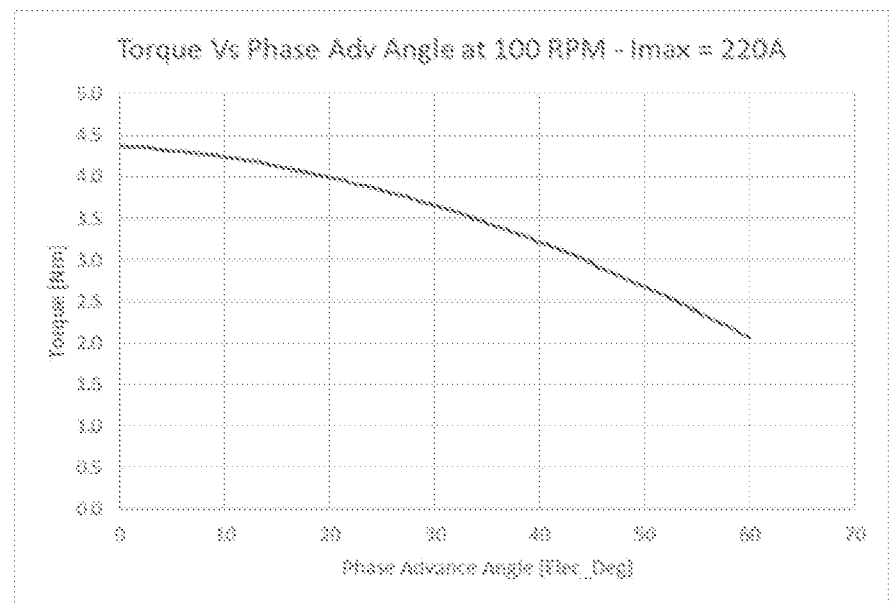
FIG. 3 depicts the torque of a typical rescue hoist drive motor versus phase advance angle at 100 RPM.

For the second option, wherein the drive current is phase advanced with respect to the back EMF the effect of phase advance is shown in FIG. 3 for a typical low voltage bus powered hoist BLDC motor.

In the case of the third option mentioned above, the field-oriented control field weakening has a similar effect to that of the second option.

FIG. 3 depicts the torque of a rescue hoist versus phase advance angle at 100 RPM. It can be seen from this figure that a phase advance of 60 degrees reduces the torque output by approximately 50%, although this will vary depending on the machine design. Typically, a phase advance of greater than 45 degrees significantly reduces a machines output torque.

The built-in test sequence is similar for both techniques, but the use of phase advance allows a high current to be used, thus testing the drive at the actual current limit rather than a reduced value.

The method may therefore comprise the steps of: starting with the cable reeled partially out, begin to partially reel the cable in at a low speed that is sufficient to disengage the primary load brake. Such speeds may be in the region of around 300 cm to 900 cm per minute (10 to 30 feet per minute). The method may then comprise the step of verifying that the drive train is rotating. In some examples, this may be achieved using first and second sensors 19, 20 as described above, and shown in FIG. 2. These sensors 19, 20 may be provided either side of the clutch 15. The method may then comprise the step of decreasing the motor torque output using either a reduced current or a phase advance, as discussed above. Following this step, the method may comprise the step of engaging the secondary brake 21. Once the secondary brake 21 is engaged, the method may comprise the step of verifying that the drive train and the cable drum 17 have stopped rotating. Once this has been confirmed, the method may comprise the step of disengaging the secondary brake 21. After this step has been performed, the method may comprise the step of restoring the motor torque output. Following this, the method may comprise the step of reeling the cable back in fully until it is in the home position.

Figure 4:
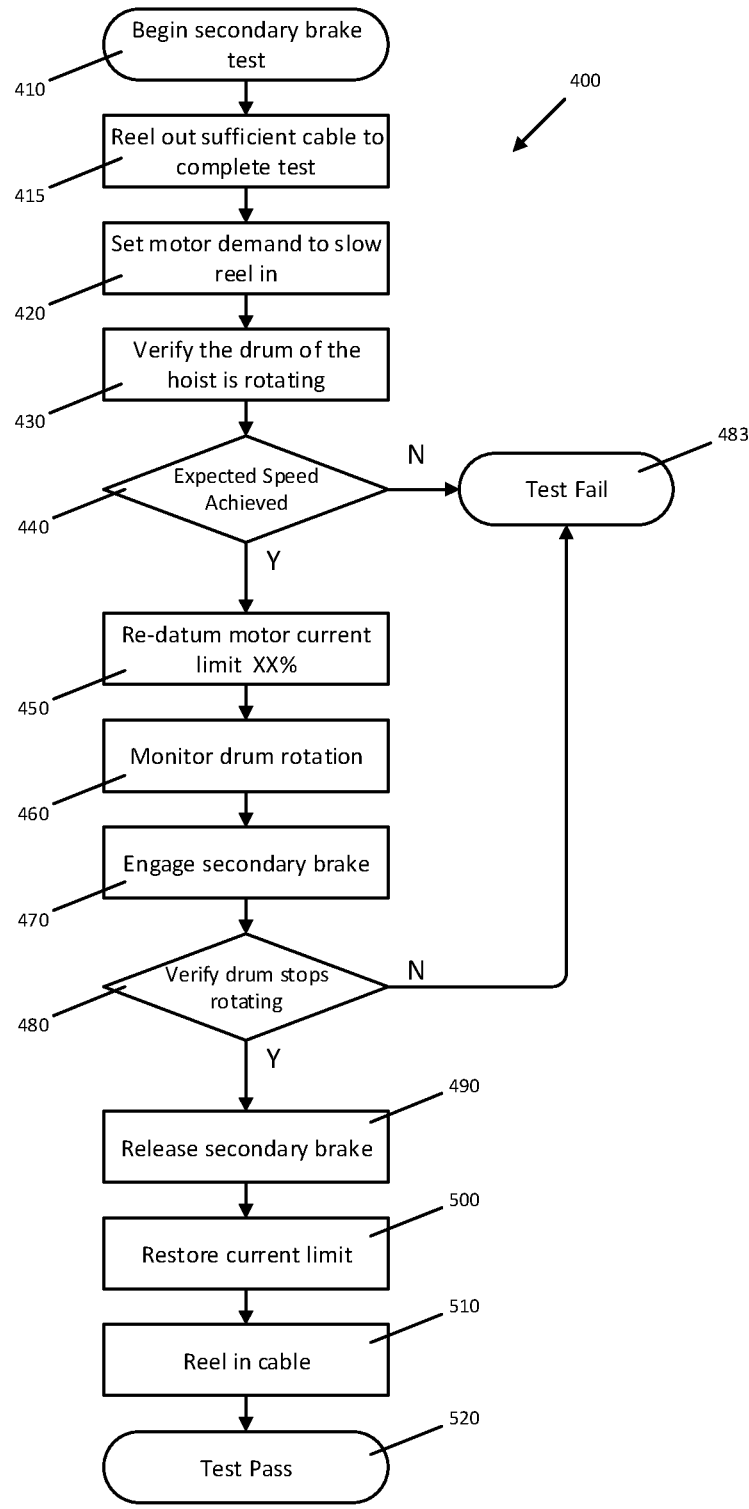
FIG. 4 depicts a method for testing a rescue hoist.
Figure 5:
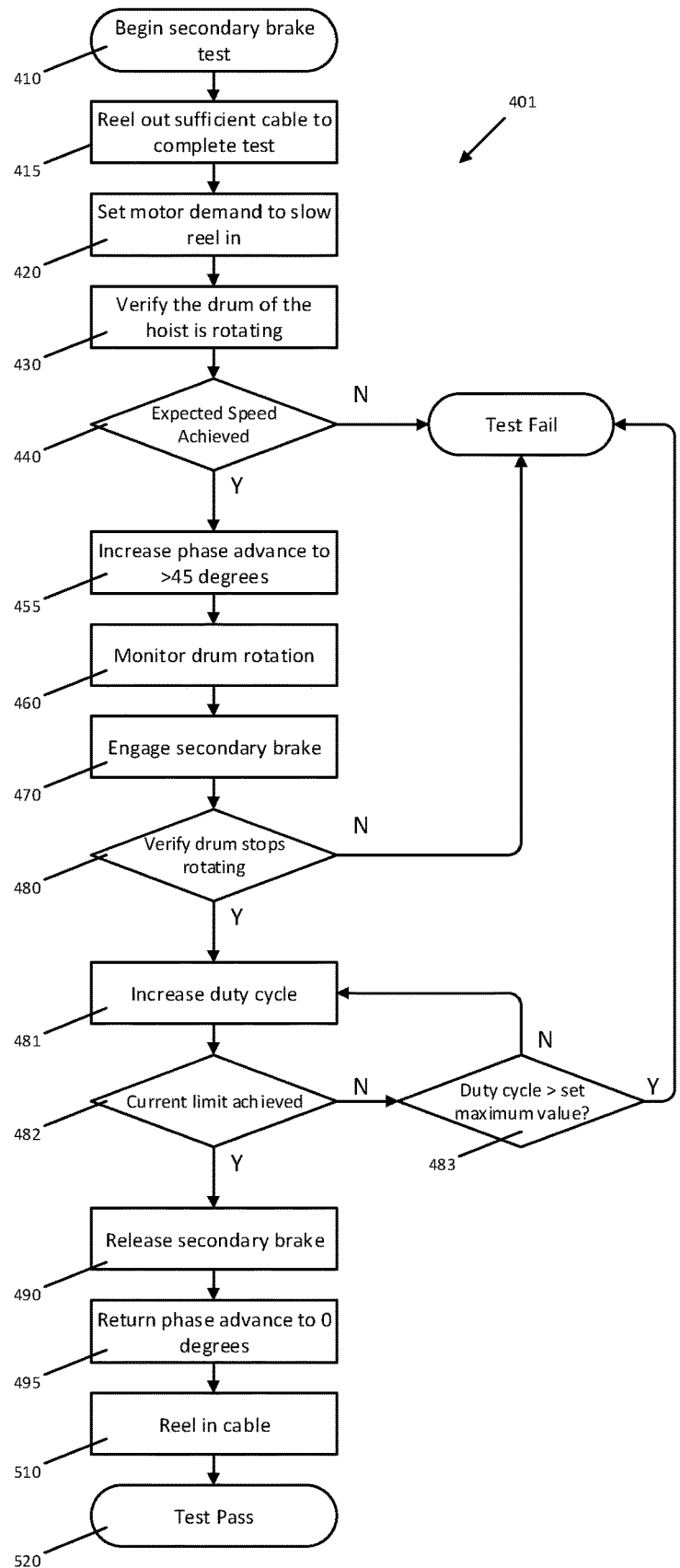
FIG. 5 depicts a method for testing a rescue hoist.

Two alternatives to this method are depicted in FIGS. 4 and 5. In FIG. 4 the motor torque is decreased by reducing the phase current. In FIG. 5 the motor torque is decreased by phase advancing the drive current.

The methods depicted in FIGS. 4 and 5 will now be described in detail.

Method 400 of FIG. 4 comprises beginning the secondary brake test 410 by starting with the cable being at least partially out of said cable drum 18. This can be achieved by first beginning to reel out sufficient cable to complete the test 415; this can either be a fixed length (such as minimum of one foot) or a single rotation of the cable drum. The cable should then be reeled in at a low speed 420 that is sufficient to disengage the primary load brake 13. The method may then comprise 430 verifying that the cable drum 18 is rotating. The method may then comprise 440 checking that the expected speed has been achieved. If the expected speed has not been achieved, then the method determines that the test has failed 483. If the expected speed has been achieved, then the method may comprise decreasing the motor torque output 450. In the method depicted in FIG. 4, this is achieved by reducing the phase current from the nominal current limit 450. Following this, the next step may be to monitor 460 drum rotation. The method may then comprise engaging 470 the secondary brake 21. The method may then comprise verifying that the drum has stopped rotating 480. If it is not verified that the drum has stopped rotating, then the method identifies that the test has failed 483. If it is verified that the drum has stopped rotating 480, the secondary brake 21 is then released 490. The current limit is then restored 500, the cable is reeled into a homed position 510 and the test is confirmed to have been passed 520.

The method 401 as depicted in FIG. 5 comprises beginning the secondary brake test 410 by starting with the cable being at least partially out of said cable drum 18. This can be achieved by beginning to reel out sufficient cable to complete the test 415; this can either be a fixed length (such as minimum of one foot) or a single rotation of the cable drum. The cable should then be reeled in at a low speed 420 that is sufficient to disengage the primary load brake 13. The method may then comprise 430 verifying that the cable drum 18 is rotating. The method may then comprise 440 checking that the expected speed has been achieved. If the expected speed has not been achieved, then the method determines that the test has failed 483. If the expected speed has been achieved, then the method may comprise decreasing the motor torque output 455. In the method of FIG. 5, this is achieved by increasing the phase advance. In some examples the phase advance may be increased by more than 45 degrees, 455. Following this step, the next step may be to monitor 460 drum rotation. The method may then comprise engaging 470 the secondary brake 21. The method may then comprise verifying that the drum has stopped rotating 480. If it is not verified that the drum has stopped rotating, then it is identified that that the test has failed 483.

For the method of FIG. 5 wherein the motor torque output is reduced by increasing the phase advance, that method may then comprise increasing the duty cycle 481 and then checking that the current limit has been achieved 482. If the current limit has not been achieved, then the method comprises the step of checking if duty cycle has been set to a maximum value 483. If it has not been set t to the maximum value, then the method returns back to the step of increasing the duty cycle 481. If it has been set to the maximum value, then the method identifies that the test has failed 483. If the current limit has been found to have been achieved 482, then the method moves on to step 490 wherein the secondary brake is released 490. The return phase advance is then returned to 0 degrees 495, the cable is reeled into a homed position 510 and the test is confirmed to have been passed 520.

In the case where the clamping force of the secondary brake 21 can be varied the test can be repeated at different torque levels to verify correct operation. For each of the test methods shown in FIGS. 4 and 5, the torque applied should be significantly lower than the torque required to slip the clutch 15. In this way no secondary brake fatigue will result from the testing of the secondary brake system.

With the method depicted in FIG. 5 the presence of an over current indication during the test can be used as a second means of verifying correct operation.

A combination of the two methods can also be performed whereby the current limit is also modified when the phase advance is applied.

For each of the built-in test methods the operation of the secondary brake 21 is positively verified, removing the possibility of a dormant fault. Employing either of the proposed methods for reducing the torque output capability of the main drive motor greatly reduces the risk of test resulting in adverse wear on the overload clutch 15.

The invention claimed is:

1. A computer implemented method for testing a rescue hoist, wherein said hoist comprises a motor drive train and the motor drive train comprises: a primary load brake; a secondary load brake; and a cable drum comprising a cable; the method comprising: starting with said cable of said hoist being at least partially out of said cable drum; reeling the cable into said cable drum at a speed that is sufficient to disengage the primary load brake; verifying that the cable drum is rotating; if verified that the cable drum is rotating, decreasing the motor torque output; engaging the secondary brake; verifying that said cable drum has stopped rotating; when verified that the cable drum has stopped rotating, disengaging the secondary brake; restoring torque motor output; and said cable is reeled into a homed position.

2. The method of claim 1, wherein said step of decreasing the motor torque output comprises reducing the phase current from the nominal current limit.

3. The method of claim 1, wherein said step of decreasing the motor torque output comprises increasing the phase advance of the motor.

4. The method of claim 3, wherein said step of decreasing the motor torque comprises increasing the phase advance by more than 45 degrees.

5. The method of claim 1, following said step of verifying that said cable drum has stopped rotating, increasing the duty cycle and checking that the current limit has been achieved.

6. The method of claim 5, wherein if said current limit has not been achieved, the method comprises the step of checking if duty cycle has been set to a maximum value.

7. The method of claim 5, wherein if said current limit has been achieved, the method comprises said step of then releasing the secondary brake.

8. The method of claim 7, wherein, if said duty cycle has not been set to the maximum value, the method returns back to the step of increasing the duty cycle.

9. The method of claim 7, wherein, if said duty cycle has been set to the maximum value, the method further comprises the step of identifying that the test has failed.

10. The method of claim 1, wherein, if in said step of verifying that said cable drum is rotating, it is verified that the said drum is not rotating, indicating that the test has failed.

11. The method of claim 1, further comprising, following the step of decreasing the motor torque output and before the step of engaging the secondary brake, monitoring the cable drum rotation.

12. A controller configured to perform the method of claim 1.

* * * * *